US012750430B1

(12) United States Patent
Nguyen et al.

(10) Patent No.: US 12,750,430 B1
(45) Date of Patent: Sep. 29, 2026

(54) SCALABLE ALIAS UPDATE FRAMEWORK FOR PROCESS AUTOMATION

(71) Applicant: Yokogawa Electric Corporation, Tokyo (JP)

(72) Inventors: Vien Nguyen, Frisco, TX (US); Patrick Clay, Frisco, TX (US); Andrew Keller, Lewisville, TX (US); Rabi Gurung, Calgary, CA (US)

(73) Assignee: Yokogawa Electric Corporation, Tokyo (JP)

( * ) Notice: Subject to any disclaimer, the term of this patent is extended or adjusted under 35 U.S.C. 154(b) by 22 days.

(21) Appl. No.: 19/066,958

(22) Filed: Feb. 28, 2025

(51) Int. Cl.

| | |
|---|---|
| ***G06F 15/16*** | (2006.01) |
| ***G06F 9/50*** | (2006.01) |
| ***H04L 67/10*** | (2022.01) |
| ***H04L 67/12*** | (2022.01) |
| ***H04L 67/55*** | (2022.01) |

(52) U.S. Cl.
CPC ............ *H04L 67/55* (2022.05); *G06F 9/5027* (2013.01); *G06F 9/5061* (2013.01); *H04L 67/10* (2013.01); *H04L 67/12* (2013.01)

(58) Field of Classification Search
CPC ......... H04L 67/55; H04L 67/10; H04L 67/12; G06F 9/5027; G06F 9/5061
See application file for complete search history.

(56) References Cited

U.S. PATENT DOCUMENTS

| | | | | |
|---|---|---|---|---|
| 7,356,529 | B1 | 4/2008 | Ennis et al. | |
| 9,310,793 | B2 | 4/2016 | Washington et al. | |
| 10,382,395 | B2 | 8/2019 | De Ligt | |
| 10,447,618 | B2 | 10/2019 | Chanda | |
| 11,622,015 | B2 | 4/2023 | Kerschbaum et al. | |
| 2020/0153838 | A1 | 5/2020 | Ge | |
| 2022/0353342 | A1 | 11/2022 | Kerschbaum et al. | |
| 2024/0221492 | A1 | 7/2024 | Emerson et al. | |
| 2024/0223530 | A1 | 7/2024 | Clay | |
| 2025/0112887 | A1 * | 4/2025 | Nguyen | H04L 61/3015 |
| 2025/0343791 | A1 * | 11/2025 | Clay | H04L 63/0884 |

* cited by examiner

*Primary Examiner* — Joseph R Maniwang
(74) *Attorney, Agent, or Firm* — Gray Ice Higdon

(57) ABSTRACT

Implementations described herein relate to a scalable alias update framework for process automation. In various implementations, an alias server detects one or more changes to one or more aliases registered to one or more nodes of a process automation facility, each node including a sensor or actuator, and the process automation facility including a plurality of distributed control nodes (DCNs) operably coupled via a process automation network. The alias server formulates one or more alias change notifications signaling one or more alias changes. The alias server takes one or more mitigative actions to mitigate an anticipated surge of incoming network traffic at the alias server responsive to the alias change notification message. The alias server broadcasts the one or more alias change notifications over one or more asynchronous publish-subscribe (PUB/SUB) channels that are subscribed to by at least some subscriber clients hosted by one or more of the DCNs.

20 Claims, 9 Drawing Sheets

800

SCALABLE ALIAS UPDATE FRAMEWORK FOR PROCESS AUTOMATION

BACKGROUND

Process automation facilities may include myriad sensors, actuators, and distributed control nodes (DCNs), among other components. Tracking these nodes using traditional node ids may present various challenges. Connection strings (e.g., IP addresses, including TCP ports) of individual nodes, as well as node IDs used to identify individual components that are accessible via those nodes, are not readily-interpretable by humans, and do not easily scale. Accordingly, Open Platform Communications Unified Architecture (OPC UA) includes a Global Discovery Server (GDS) that provides an "Alias Name Service" (ANS) that facilitates the mapping of aliases (strings of characters that are human-readable/meaningful) to connection strings and node IDs. In other words, the GDS can act like a "phone book" for OPC UA clients.

An OPC UA client application at various times will connect to the GDS and retrieve a list of aliases (structured data of alias name, IP address of the server, node ID inside that server). After retrieving this list of aliases, the OPC UA client will disconnect from the GDS, and use the alias information to communicate directly with one or more components associated with the aliases. If aliases are created, updated or deleted, the OPC UA client does not have an efficient way to get the updated alias information.

Currently, OPC UA clients obtain updated alias information by continuously/periodically polling the GDS using stateful and/or persistent connections such as a Transmission Control Protocol (TCP) connection; this type of connection may be referred to herein as an OPC UA client/server connection. Process automation facilities typically have massive numbers of nodes, such as DCNs, devices, clients, etc. Thus, the continuous polling using a stateful and/or persistent connection is not an optimal solution because it can overload the GDS application resources or place unnecessary traffic on the network. A more efficient method is needed to notify OPC UA clients that alias information pertinent to them may have changed, without creating a strain on the GDS application or unnecessary network traffic. However, if too many OPC UA clients/servers connections to the GDS at once, the resources of the GDS and/or the system as a whole may become strained.

SUMMARY

Implementations disclosed herein are directed to mitigating surges of traffic at alias servers of process automation facilities. An alias server detects one or more changes to one or more aliases registered to one or more nodes. One or more alias change notifications are formulated that signal one or more alias changes. One or more mitigative actions are taken to mitigate an anticipated surge of incoming network traffic at the alias server. The one or more alias change notifications are broadcast over one or more asynchronous publish-subscribe (PUB/SUB) channels. This method of one-to-many notifications is more effective as many client applications may be interested in the same alias.

Several mitigative actions can be employed to reduce strain on the GDS. These include preemptively scaling the GDS vertically (allocating more resources) or horizontally (instantiating additional GDS instances), potentially using Kubernetes replica sets. Additionally, the alias change notification message can include information to reduce client urgency, such as indicating whether an alias was deleted.

Finally, using separate broadcast channels for different types of system changes allows clients to filter irrelevant notifications, reducing unnecessary traffic and GDS load. Staggering client connections based on instructions within the notification message further distributes the load.

Implementations disclosed herein can mitigate (e.g., eliminate) various drawbacks with current techniques. For example, the use of a pub/sub framework with non-persistent or "stateless" connections, e.g., user datagram protocol (UDP) or Message Queuing Telemetry Transport (MQTT), eliminates the need for continuous polling by using OPC UA clients/servers protocol, thereby reducing the load on the GDS and network traffic. As another example, incorporating information about the nature of the alias change (e.g., deletion) into the notification message allows clients to take appropriate action without contacting the GDS. As another example, using separate broadcast channels for different types of system changes allows clients to filter out irrelevant notifications, reducing unnecessary traffic and GDS load. As yet another example, scaling up a GDS vertically or horizontally using techniques such as Kubernetes replica sets allows incoming traffic to be spread across multiple servers (or multiple sets of servers), further reducing traffic. As a further example, scaling down a GDS after an initial large spike in traffic subsides (e.g., based on a certain amount of time or number of connections) mitigates overload risks, thereby increasing the reliability of the system.

As a non-limiting example of some implementations disclosed herein, consider a large-scale industrial facility using a process automation system with hundreds of sensors and actuators spread across numerous DCNs. These devices are registered with a GDS using aliases. A significant system upgrade necessitates changing the connection strings for dozens of aliases. The GDS detects these changes and formulates alias change notifications. To mitigate the potential network surge, the GDS incorporates an indication within each notification specifying the affected aliases and instructs disjoint subsets of the subscriber clients to stagger their connection attempts to the GDS over a 10-second interval, using a unique identifier for each subset. The notifications are then broadcast via MQTT over separate PUB/SUB channels dedicated to alias updates, thereby preventing a simultaneous flood of requests to the GDS. The GDS, preemptively scaled up via a Kubernetes replica set before broadcasting, efficiently handles the staggered requests, preventing overload and ensuring timely alias updates across all DCNs.

Additionally or alternatively, in some implementations, one or more GDS's may be implemented on a mesh network. In anticipation of a surge of network traffic, one or more nodes of the mesh network that are inactive or engaged in other activity may be requisitioned to provide additional GDS capacity. Making additional nodes to the GDS in this manner may enable the GDS to handle a larger number of requests concurrently. In addition, by distributing the GDS workload across multiple nodes in a mesh network, the distance that data needs to travel can be reduced. This can lead to lower latency and faster response times for OPC UA clients. Similar principles may be applied vis-à-vis multi-core processors. For example, one or more additional cores may be temporarily allocated to a GDS in anticipation of a surge of alias update requests.

DETAILED DESCRIPTION

Implementations described herein relate to a guaranteed delivery publication/subscription (pub/sub) framework for an alias server in a process automation environment, such as a Global Discovery Server (GDS) provided by an Open Platform Communications Unified Architecture (OPC UA), that avoids the inefficiencies of continuous polling for updated alias information. Techniques described herein may alleviate the resource strain and network congestion caused by OPC UA clients/servers repeatedly (e.g., periodically) using persistent network connections to poll the GDS for updates to the alias name service (ANS), which maps human-readable aliases to connection strings and node IDs.

This disclosure also addresses network congestion and GDS overload resulting from numerous clients, such as OPC UA clients, simultaneously retrieving updated alias information after system changes. Conventional techniques of relying on clients periodically polling the GDS via persistent TCP connections is inefficient and unsustainable for large client numbers. Techniques described herein relate to a publish/subscribe (pub/sub) system broadcasting alias updates using a non-persistent protocol, such as UDP or MQTT. This reduces GDS and network load.

In some implementation, the GDS adds information to published messages (e.g., to make those messages "targeted"), such as deleting alias instructions, to reduce client urgency. As another way to reduce strain on the GDS, different broadcast channels may be established for distinct categories of system changes. For instance, a dedicated channel handles alias changes, another manages server registrations, and a third is reserved for information model updates. This topic-based channel segregation allows clients to subscribe only to channels relevant to their needs, significantly reducing the volume of messages each client receives and the overall load on the GDS. Clients may filter messages based on their subscriptions, only processing updates pertinent to their operations, thereby enhancing efficiency and minimizing unnecessary network traffic. In some implementations, preemptive horizontal scaling, e.g., implemented using Kubernetes replica sets, handles anticipated request surges by at least temporarily instantiating additional instances of the GDS. Vertical scaling may additionally or alternatively increase compute resources allocated to a GDS. Various techniques described herein scale the GDS down afterward.

Figure 1:
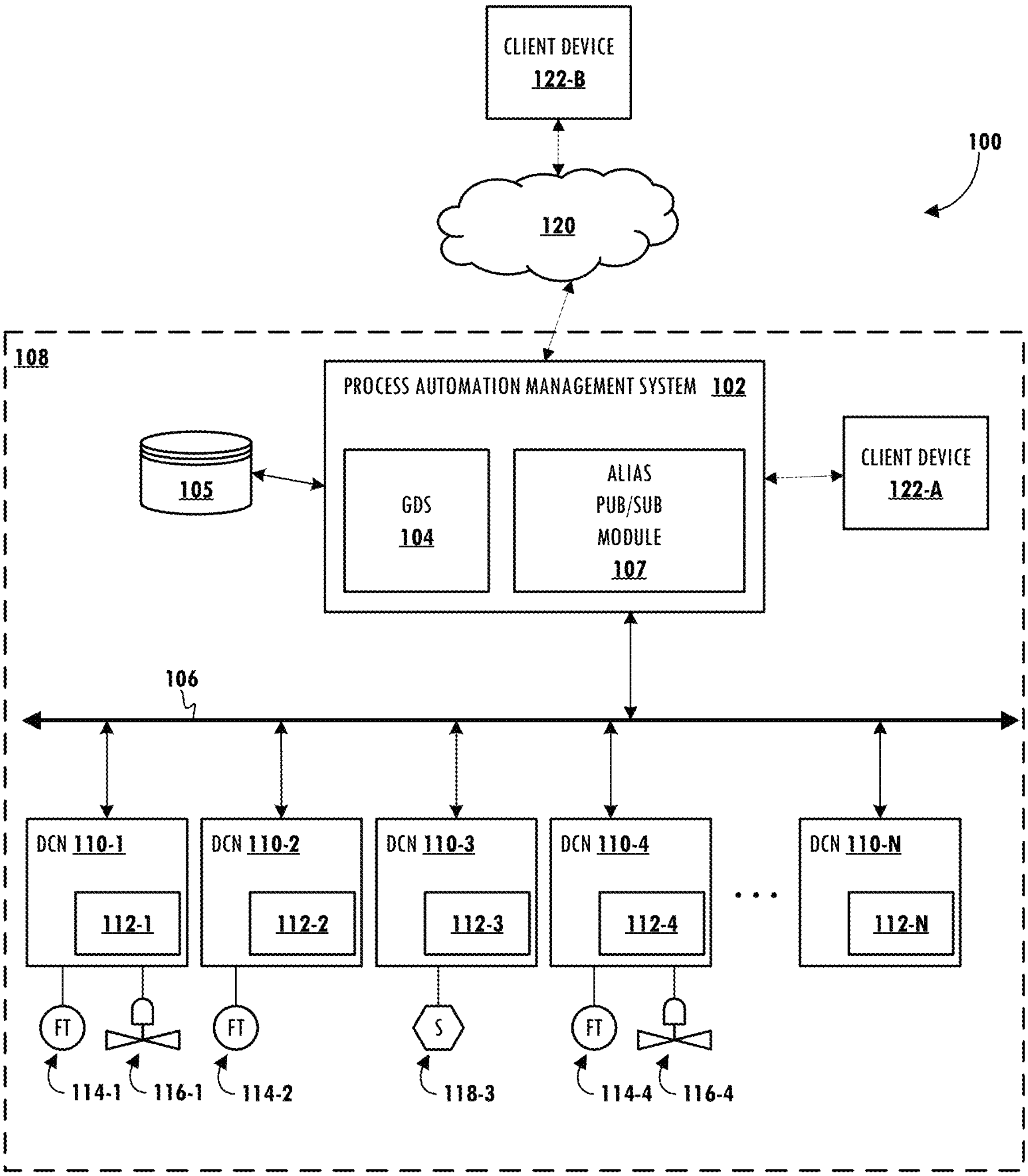
FIG. 1 shows an example environment including a process automation management system, a process automation network, and multiple distributed control nodes.

Referring now to FIG. 1, an example environment 100 in which various aspects of the present disclosure may be implemented is depicted schematically. A process automation management system 102 is operably coupled with a process automation network 106 in a process automation facility 108. Process automation facility 108 may take numerous forms and may be designed to implement any number of at least partially automated processes. For example, process automation facility 108 may take the form of a chemical processing plant, an oil or natural gas refinery, a catalyst factory, a manufacturing facility, an offshore oil platform, etc.

Process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 may be configured with redundancies and/or backups to provide high availability (HA) and/or high quality of service (QoS).

Process automation management system 102 may include a GDS 104, an alias publication-subscribe (pub/sub) module 107, and a database 105 that stores information used by GDS 104 and/or alias pub/sub module 107 to practice selected aspects of the present disclosure. Various aspects of process automation management system 102, such as GDS 104 and/or alias pub/sub module 107, may be implemented using any combination of hardware and software. In some implementations, process automation management system 102 may be implemented across multiple computer systems as part of what is often referred to as a "cloud infrastructure" or simply the "cloud." However, this is not required, and in FIG. 1, for instance, process automation management system 102 is implemented within process automation facility 108, e.g., in a single building or across a single campus of buildings or other industrial infrastructure. In such an implementation, process automation management system 102 may be implemented on one or more local computing systems, such as on one or more server computers.

In addition to process automation management system 102, a variety of other nodes are operably coupled with process automation network 106. In FIG. 1, for instance, N (positive integer) DCNs 110-1 to 110-N are operably coupled with process automation network 106. Each DCN may include circuitry or logic 112 that may take various forms, such as processor(s) that execute instructions in memory, a field-programmable gate array (FPGA), an application-specific integrated circuit (ASIC), and so forth. Each DCN 110 may have a particular role to play in process automation network 106. "Compute" DCNs may, for instance, control a process loop (e.g., a chemical process loop) in which various "field" devices (e.g., devices having sensors and/or actuators) interface with each other to perform some number of function control blocks (FBs).

While not depicted in FIG. 1, in various implementations, each DCN may execute a cross-platform server that orchestrates access to the DCN's constituent I/O channels. In some cases, this cross-platform server may take the form of an OPC-UA server. Additionally or alternatively, each DCN may operate a cross-platform client that is configured to subscribe to I/O channels (e.g., made accessible by the aforementioned cross-platform server) in order to receive information needed for the DCN to perform some function. In some cases, this cross-platform client may take the form of an OPC-UA client.

Each DCN 110 may have various I/O components, which are accessible as "channels," and which dictate at least some of its operational technology (OT) capabilities and, more generally, its role at process automation facility 108. For example, first DCN 110-1 includes a flow transmitter (FT) component 114-1 and an actuator (e.g., a valve) 116-1. In some implementations, a software component (e.g., a function block) implemented on DCN 110-1 (or any other DCN mentioned herein) may transform an analog signal to digital; and/or convert the signal between different units of measurement, for instance.

In addition, in some implementations, a software component (e.g., a function block) implemented on DCN 110-1 may be configured to translate data between various protocols. For example, a particular vendor's DCN (or other legacy device) may not be configured natively to communicate data using the OPC UA. In some such implementations, another DCN 110 may be deployed to translate this data from the vendor's proprietary format to OPC UA. Some such DCNs 110 may be referred to as "gateways" or "bridges" because they form a link between legacy technology and standards such as OPC UA.

Actuator 116-1 (and other actuators described herein) may be any electric, hydraulic, mechanical, and/or pneumatic component that is controllable to affect some aspect of a process automation workflow that occurs at process automation facility 108. In many cases, an actuator 116 may perform its function in response to various signals, such as sensor signals or commands from compute DCNs (which themselves may monitor for sensor signals). Some non-limiting examples of actuators 116 include, but are not limited to, valves, pistons, rotors, switches, heaters, coolers, stirrers, injectors, devices to create vacuums, belts, tracks, gears, grippers, motors, relays, servomechanisms, etc.

Each DCN 110 may have different OT capabilities with respect to one or more (e.g., all) other DCNs 110. In FIG. 1, for instance, second DCN 110-2 includes a FT component 114-2 but no actuator. Third DCN 110-3 includes a sensor 118-3 but no actuator. Sensor 118-3 (and elsewhere herein) may take various forms, including but not limited to a pressure sensor, a temperature sensor, a flow sensor (e.g., FT component 114), various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth. Like first DCN 110-1, fourth DCN 110-4 also includes both a FT component 114-4 and an actuator 116-4.

Unlike DCNs 110-1 to 110-4, DCN 110-N does not include any input/output (actuators or sensors) components. Instead, DCN 110-N may be a "compute only" DCN whose role is to facilitate cooperation between itself and one or more other DCNs 110 on process automation network 106 to implement an at least partially automated process. For example, DCN 110-N may control a single process loop (e.g., a chemical process control loop) that involves one or more other DCNs 110. In some cases, a compute DCN 110 may perform a role similar to an autopilot on an airplane—the compute DCN 110 may receive various signals and, based on those signals and various criteria and/or thresholds, control various actuators. For example, the compute DCN 110 may monitor various sensors 118 to ascertain data about chemical levels, flow rates (e.g., across valves), tank temperatures, control rates, etc., and may control one or more actuators 116 based on these data and/or comparisons of these data to various criteria and/or thresholds. For instance, compute DCN 110-N can control actuator 116-4 by transmitting, to DCN 110-4, corresponding command(s) that can optionally conform to a protocol that is specific to DCN 110-4.

Many DCNs may host multiple resources such as physical I/O components and/or function blocks. Consequently, these DCNs may include multiple I/O channels and/or function blocks that can be accessed, e.g., by other devices or systems such as other DCNs, GDS 104, alias pub/sub module 107, etc. For example, each DCN 110 may host a cross-platform server, such as an OPC UA server, that provides access to various resources hosted by the DCN 110, including the DCN's I/O channels and/or function blocks. A cross-platform client application, such as an OPC UA client operating on a DCN 110, may connect to a cross-platform server hosted by the DCN so that it can read data from input channels associated with, for instance, sensors such as FT components 114, sensors 118, function blocks, etc. Likewise, the client application may connect to the server hosted by the DCN to write data to output channels, e.g., to provide control signals or commands to actuators 116.

As noted above, tracking the myriad data sources (e.g., I/O channels and/or other data sources such as function blocks) of DCNs deployed across a complex process automation facility 108 using typical connection strings (e.g., networking information plus node IDs) may present various challenges. Connection strings of individual nodes, which may include Internet Protocol (IP) addresses and/or Transmission Control Protocol (TCP) ports, as well as node IDs used to identify individual components that are accessible via those nodes, are not readily interpretable by or meaningful to humans, and do not easily scale. Hence, GDS 104 is used to assign human-interpretable and/or meaningful aliases to the various data sources made available by the DCNs.

As an example, an OPC UA server executing on a DCN 110 may be reachable, e.g., by an OPC UA client, using the following networking information:

opc.tcp://10.0.1.1:4840

The characters "opc.tcp" specify a connection protocol to be used. The numbers "10.0.1.1" may be an IP address of the DCN executing the OPC UA server. The numbers "4840" may be the TCP port to which the OPC UA server is listening and accepting connections. This OPC UA server may in turn provide access to multiple data sources, such as I/O channels or other pieces of data (e.g., sensor readings stored in memory, results of calculations, semaphore values, etc.). Each of these individual data sources may be referenced using a Node ID, such as:

ns=5;i=5242

An OPC UA client, and by extension, a person controlling it, may need to know both these unintuitive and/or cryptic values in order to access the particular data source.

Accordingly, OPC UA servers executing on DCNs can register aliases to GDS 104 using an Alias Name Server (ANS). This allows an alias to be created that maps a human-interpretable alias (e.g., "MyAlias1") to the connection string set forth above. In other words, an alias identifies, for OPC UA clients, which OPC UA server, and where on that OPC UA server, a particular data source can be accessed. Later, an OPC UA client seeking to access the data source may query GDS 104 using an alias (e.g., "MyAlias1"). GDS 104 may respond by providing networking information including the corresponding connection string. The OPC UA client can then use this connection string to establish a connection to the corresponding OPC UA server, and read data from and/or write data (e.g., control signals or commands) to the data source.

As noted above, in conventional arrangements, DCNs 110-1 to 110-N may establish and/or maintain stateful and/or persistent (e.g., TCP) connections (e.g., using sockets) with GDS 104 periodically or continuously so that they can obtain updated information about aliases. However, this can result in heavy demand for network bandwidth, and can also place unnecessary network load on process automation management system 102 and DCNs 110. Accordingly, in various implementations, alias pub/sub module 107 may be configured to broadcast, in a stateless and/or connectionless manner, using stateless and/or connectionless datagrams, alias updates over the process automation network 106 of process automation facility 108. Instead of DCNs 110 periodically establishing and/or maintaining persistent and/or stateful connections with GDS, DCNs 110 may receive these alias updates as connectionless datagrams. The DCNs 110 may then establish ad hoc connections with GDS 104 in response to receiving these alias updates as stateless and/or connectionless datagrams, rather than on periodic and/or automatic basis. Once connected (which may be implemented using stateless or stateful connections), the DCNs 110 may request updated alias information.

If every DCN 110 immediately connected to GDS 104 in response to every broadcasted alias update, GDS 104 may be overloaded. For example, GDS 104 may receive and/or be inundated with a large number of alias update requests within a short period, with each update request containing a relatively large, and possibly changing, set of alias values. As a more concrete example, consider a factory that utilizes hundreds or even thousands of sensors and actuators, each of which is assigned a unique alias. If the DCNs that host these sensors and actuators all connect to GDS at once, GDS (which may take minutes to update the hundreds or thousands of aliases) will be inundated with hundreds or thousands of alias update requests, thereby overloading GDS resources. Accordingly, techniques described herein include various mechanisms for mitigating or eliminating such overload. These mitigation techniques may include, for instance, proactively scaling GDS 104 and/or alias pub/sub module 107 horizontally or vertically, by instructing DCNs 110 (individually or in groups) to stagger connections to GDS 104, by instructing DCNs 110 (individually or in groups) to implement "break before make" when connecting to GDS 104, etc.

FIGS. 2-6 schematically depict examples of how various components may cooperate to practice selected aspects of the present disclosure. In FIGS. 2-6, alias pub/sub module 107 is depicted as being part of GDS 104, but as shown in FIG. 1, in other implementations, these components may be implemented separately, e.g., as part of a larger process automation management system 102. In FIGS. 2-5, a first DCN 210-1, a second DCN 210-2, a third DCN 210-3, a fourth DCN 210-4, a fifth DCN 210-5, and a sixth DCN 210-6 are depicted are being communicatively coupled with GDS 104 via one or more process automation networks 106. While not depicted, each of DCNs 210-1 to 210-6 may host a cross platform client (e.g., OPC UA client) and/or a cross platform server (e.g., OPC UA server). Six DCNs are depicted for illustrative purposes only; it should be understood that any number of DCNs may be deployed in a process automation facility.

First DCN 210-1 is equipped with an FT component 214-1 assigned an alias "MAIN FT" and a thermometer 218-1 assigned the alias "MAIN TEMP." Second DCN 210-2 includes an actuator 216-1 that is assigned the alias "MAIN VALVE." As shown by the arrow, second DCN 210-1 (or more particularly, a cross platform client and/or function block hosted thereby) is subscribed to the "MAIN FT" alias, and hence, second DCN 210-2 is communicatively coupled with first DCN 210-1, e.g., over one or more of the process automation networks 106. As shown by the arrow at bottom, second DCN 210-2 (or more particularly, a cross platform client and/or function block hosted thereby) is also subscribed to the pressure sensor 218-2 assigned the alias "SLURRY PRESS." (short for "PRESSURE"), which is hosted by fifth DCN 210-5. Thus, for instance, second DCN 210-2 may operate actuator 216-1 based on value(s) received (e.g., retrieved, pushed) from FT component 214-1 and pressure sensor 218-2.

Third DCN 210-3 is equipped with an actuator 216-2 assigned the alias "AUX VALVE." As indicated by the arrow, third DCN 210-3 (or more particularly, a cross platform client and/or function block hosted thereby) is subscribed to thermometer 218-1 so that temperature(s) sensed by thermometer 218-1 can be used by DCN 210-3 to operate actuator 216-2. Fourth DCN 210-4 is equipped with an actuator 216-3 that is assigned the alias "SLURRY VALVE." As indicated by the arrow, fourth DCN 210-4 (or more particularly, a cross platform client and/or function block hosted thereby) is subscribed to the alias "SLURRY PRESS." that is registered to pressure sensor 218-2 hosted by fifth DCN 210-5. All of these aliases are documented in an alias list stored in alias database 105, depicted at top right.

Figure 2:
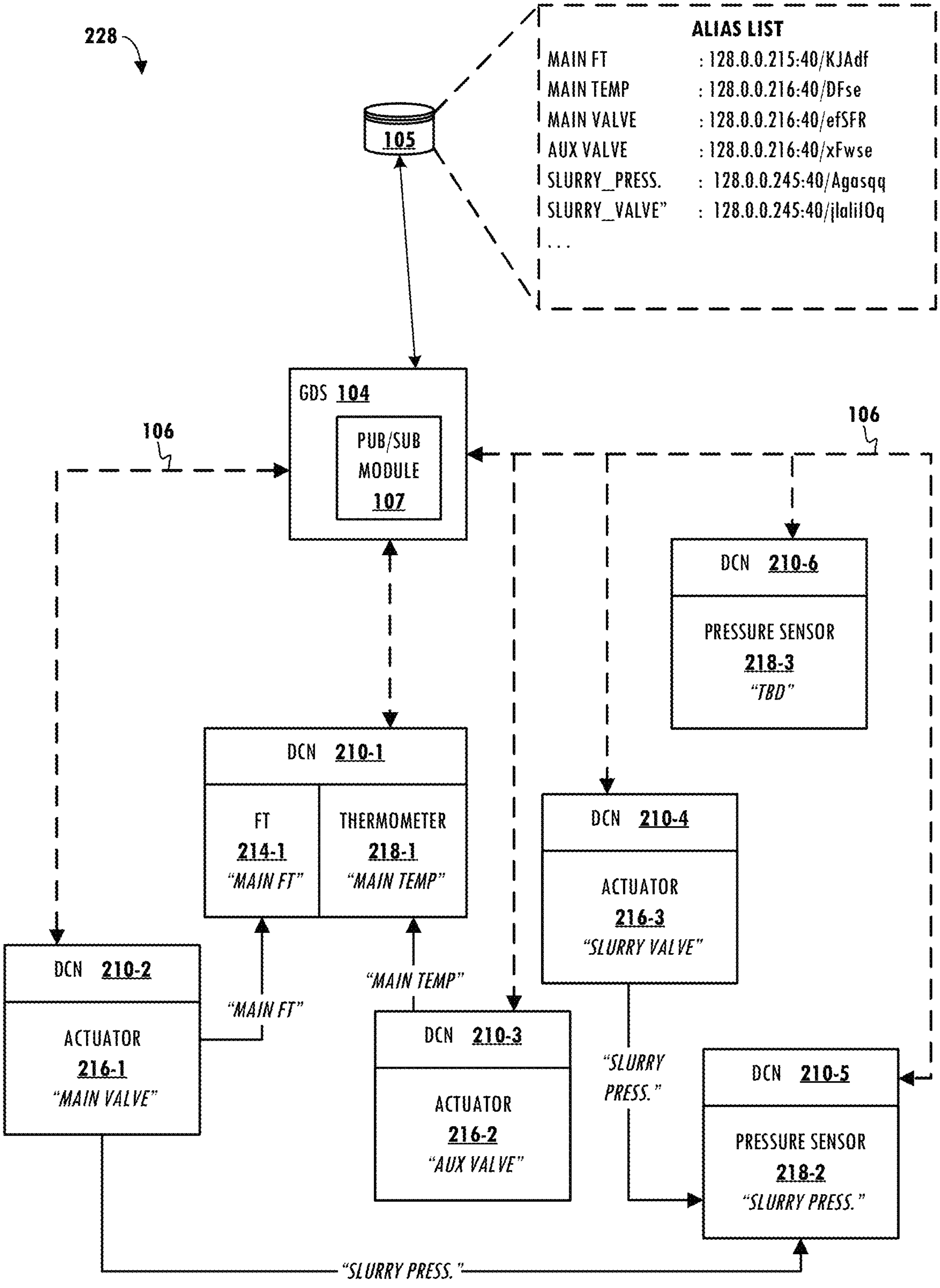
FIG. 2 shows an example of a process automation facility with multiple distributed control nodes, each subscribed to various aliases.
Figure 3:
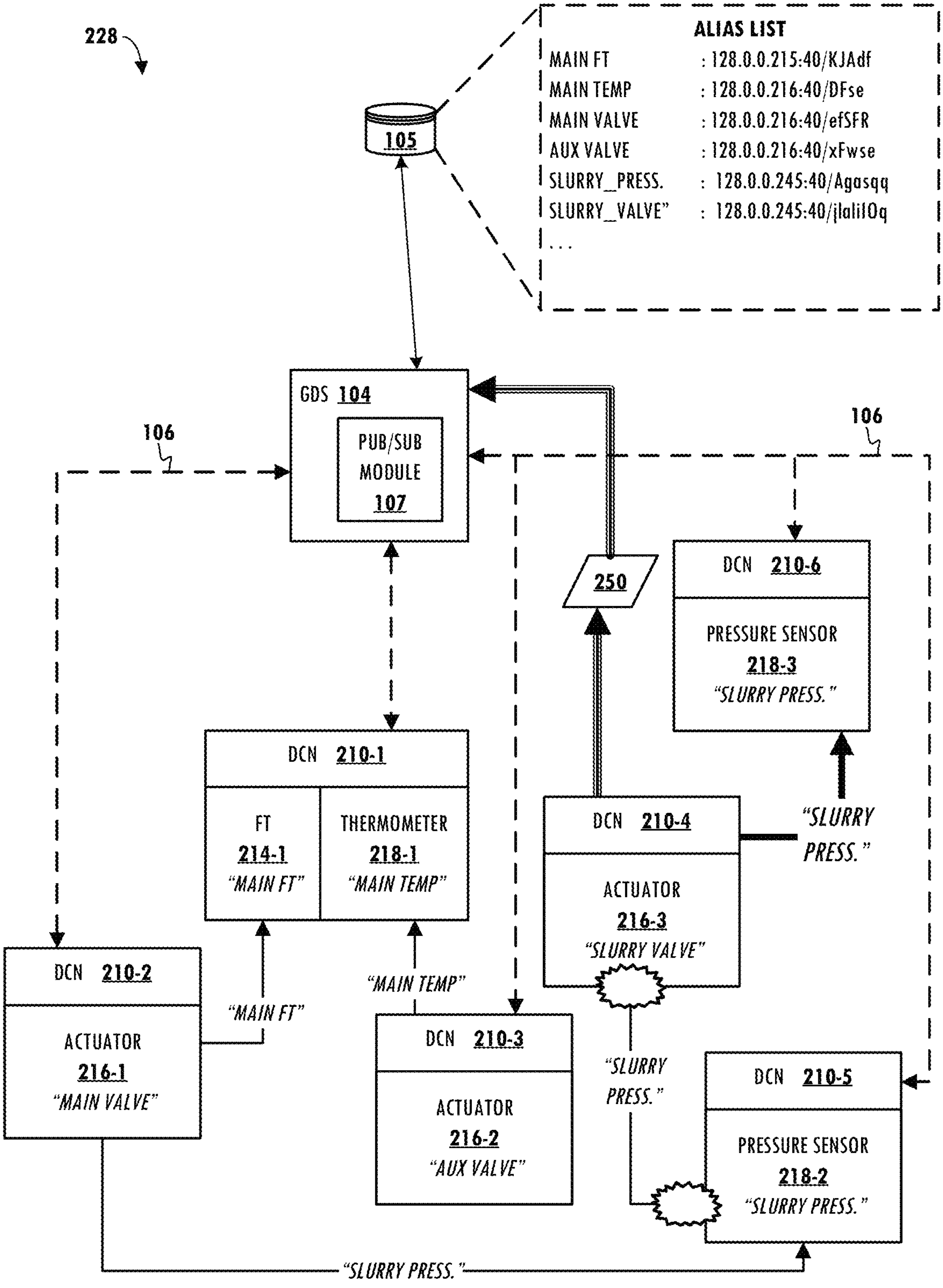
FIG. 3 shows an example of an alias being moved from one sensor to another in the process automation facility.

Sixth DCN 210-5 is equipped with another pressure sensor 218-3 that, in FIG. 2, does not yet have an assigned alias. However, in FIG. 3, as indicated by the bursts between fourth DCN 210-4 and fifth DCN 210-5, and by the new arrow between fourth DCN 210-4 and sixth DCN 210-6, the alias "SLURRY PRESS." has been moved from pressure sensor 218-2 of fifth DCN 210-5 to pressure sensor 218-3 of sixth DCN 210-6. Fourth DCN 210-4 (or in other implementations, fifth DCN 210-5) sends an alias registration message 250 to GDS 104 to inform GDS 104 of the movement of the alias "SLURRY PRESS." from pressure sensor 218-2 of fifth DCN 210-5 to pressure sensor 218-3 of sixth DCN 210-6.

Figure 4:
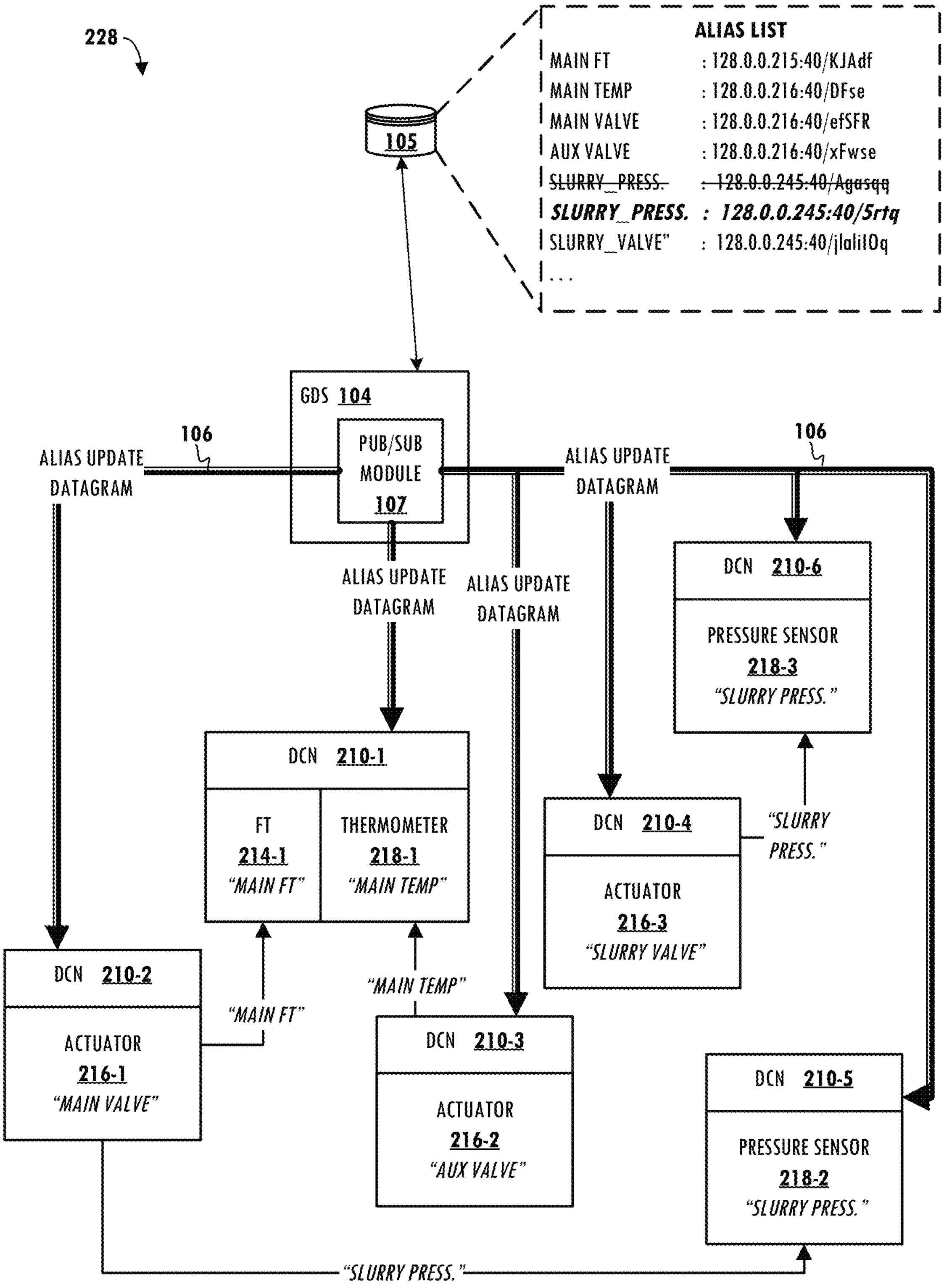
FIG. 4 shows an example of an alias update message being generated and broadcast across the process automation network.

Consequently, in FIG. 4, the alias list stored in database 105 has been updated to reflect this change, with a new connection string "128.0.0.245:40/5rtq" of pressure sensor 218-3 replacing the old connection string "128.0.0.245:40/Agasqq" of pressure sensor 218-2. Meanwhile, and as indicated by the thicker arrows, pub/sub module 107 has generated an alias update datagram and broadcast that over process automation network(s) 106 so that it is received by first DCN 210-1, second DCN 210-2, third DCN 210-3, fourth DCN 210-4, fifth DCN 210-5, and sixth DCN 210-6, among others.

Figure 5:
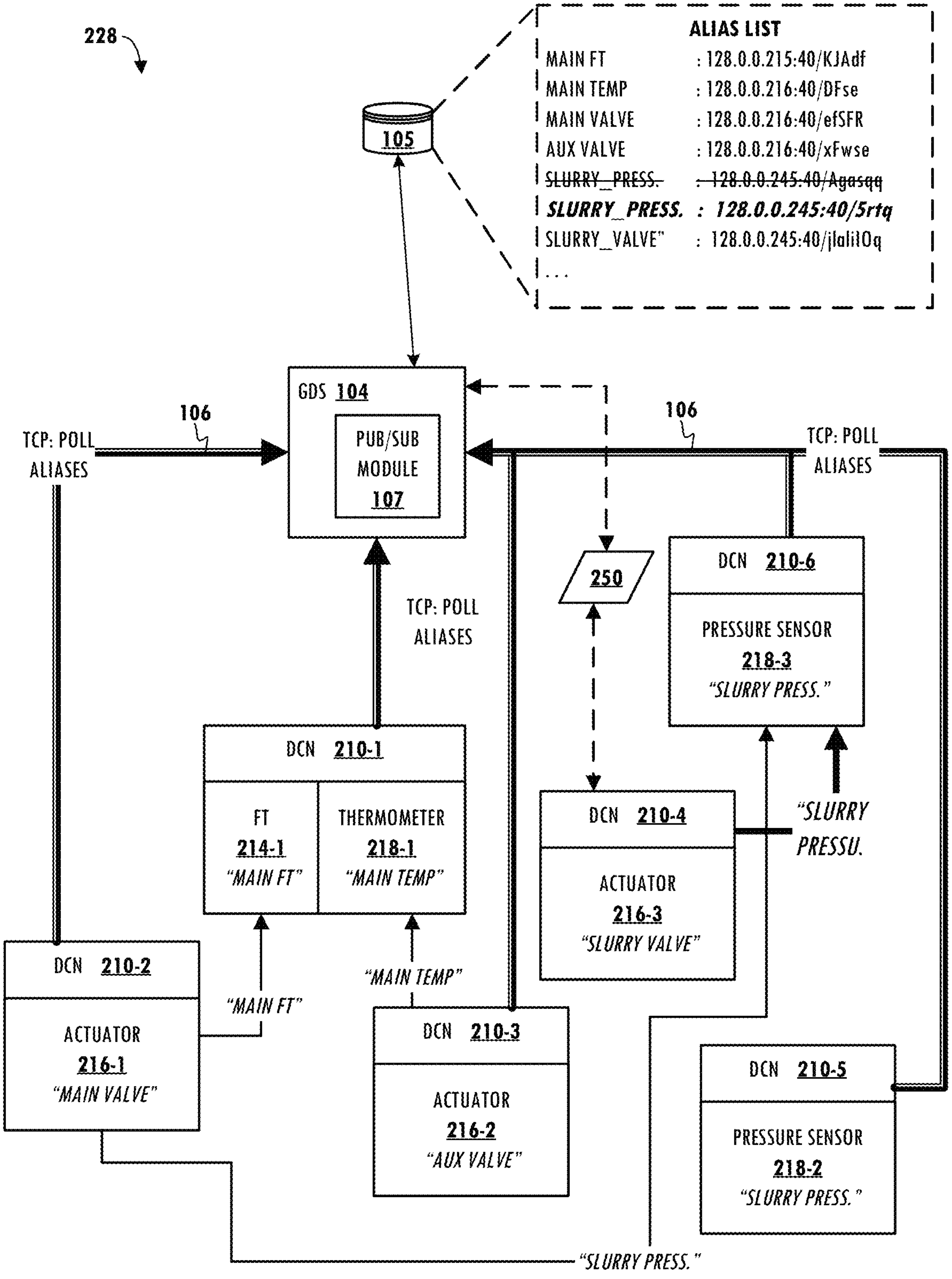
FIG. 5 shows an example of how multiple distributed control nodes react to an untargeted alias update message.

FIG. 5 depicts one example of how DCNs 210-1 to 210-6 may react upon receiving the broadcasted alias update datagram as shown in FIG. 4. In FIG. 5, as demonstrated by the thick arrows, each of DCNs 210-1 to 210-3, 210-5, and 210-6 has established a stateful connection (e.g., TCP, socket connection, etc.) with GDS 104. Using these stateful connections, each of DCNs 210-1 to 210-3, 210-5, and 210-6 polls aliases maintained by GDS 105 in database to obtain updated aliases. As a consequence, GDS 104 may provide updated aliases to each of these DCNs. This includes the new connection string "128.0.0.245:40/5rtq" of pressure sensor 218-3 that replaced the old connection string "128.0.0.245:40/Agasqq" of pressure sensor 218-2. Thereafter, any DCN that hosts a cross platform client/server or function block that subscribes to the "SLURRY PRESS." alias may update its own alias list so that it can receive pressure readings from pressure sensor 218-3 moving forward, instead of from pressure sensor 218-2. This is reflected at bottom where the arrow that previously connected second DCN 210-2 to fifth DCN 210-5 now connects second DCN 210-2 to pressure sensor 218-3 of sixth DCN 210-6.

As noted previously, if all these DCNs 210-1 to 210-6 (and likely far greater numbers of DCNs in a realistic industrial setting) were to connect to GDS 104 at once, as depicted in FIG. 5, GDS 104 may be overwhelmed. Accordingly, the techniques described herein include additional mechanisms for preventing such overburdening of GDS 104. In some implementations, the alias update datagram broadcast in FIG. 4 may include instructions or other data that causes DCNs 210-1 to 210-6 to stagger their connections to GDS 104, e.g., individual and/or in groups (e.g., subnets). These instructions to stagger connections may be implemented in various ways. In some implementations, the alias update datagram may instruct DCNs 210-1 to 210-6 to stagger or "break before make" their connections to GDS 104, so that one or more of the DCNs 210-1 to 210-6 connect to GDS 104 only at time(s) when other(s) of the DCNs 210-1 to 210-6 are not connected. For example, the alias update datagram may include a bitmask or subnet mask that, when applied to IP addresses of the DCNs 210-1 to 210-6, will indicate which DCNs (or groups of DCNs, e.g., organized into subnets) are to make connections at which time intervals beyond receipt of the alias update datagram.

Additionally or alternatively, in some implementations, mechanisms such as semaphores may be utilized. For example, a semaphore may be used by GDS 104 and/or alias pub/sub module 107 to inform which DCNs 210-1 to 210-6 should or should not connect to GDS 104 at a particular time. For example, the GDS 104 and/or alias pub/sub module 107 may maintain a semaphore indicating that all DCNs 210-1 to 210-6 should not connect. In some implementations, the semaphore may include multiple bits in which different DCNs 210-1 to 210-6 may be represented by different portions of the bits. For example, one or more DCNs 210-1 to 210-6 may be represented by one or more binary digits of the bits, and another DCN 210-1 to 210-6 may be represented by another set of one or more binary digits of the bits. The DCNs 210-1 to 210-6 may have access to this semaphore, and may utilize it to determine when they are permitted to make connections to GDS 104. In other implementations, when a DCN attempts to connect to GDS 104, it may perform a "wait" operation. If the semaphore's value is greater than zero, the DCN decrements the semaphore's value and proceeds. If the semaphore's value is zero, the DCN may be blocked and wait until the semaphore goes above zero. When another DCN completes its session with GDS 104, it may perform a "signal" operation, e.g., to increment the semaphore's value, potentially unblocking a waiting DCN.

Figure 6:
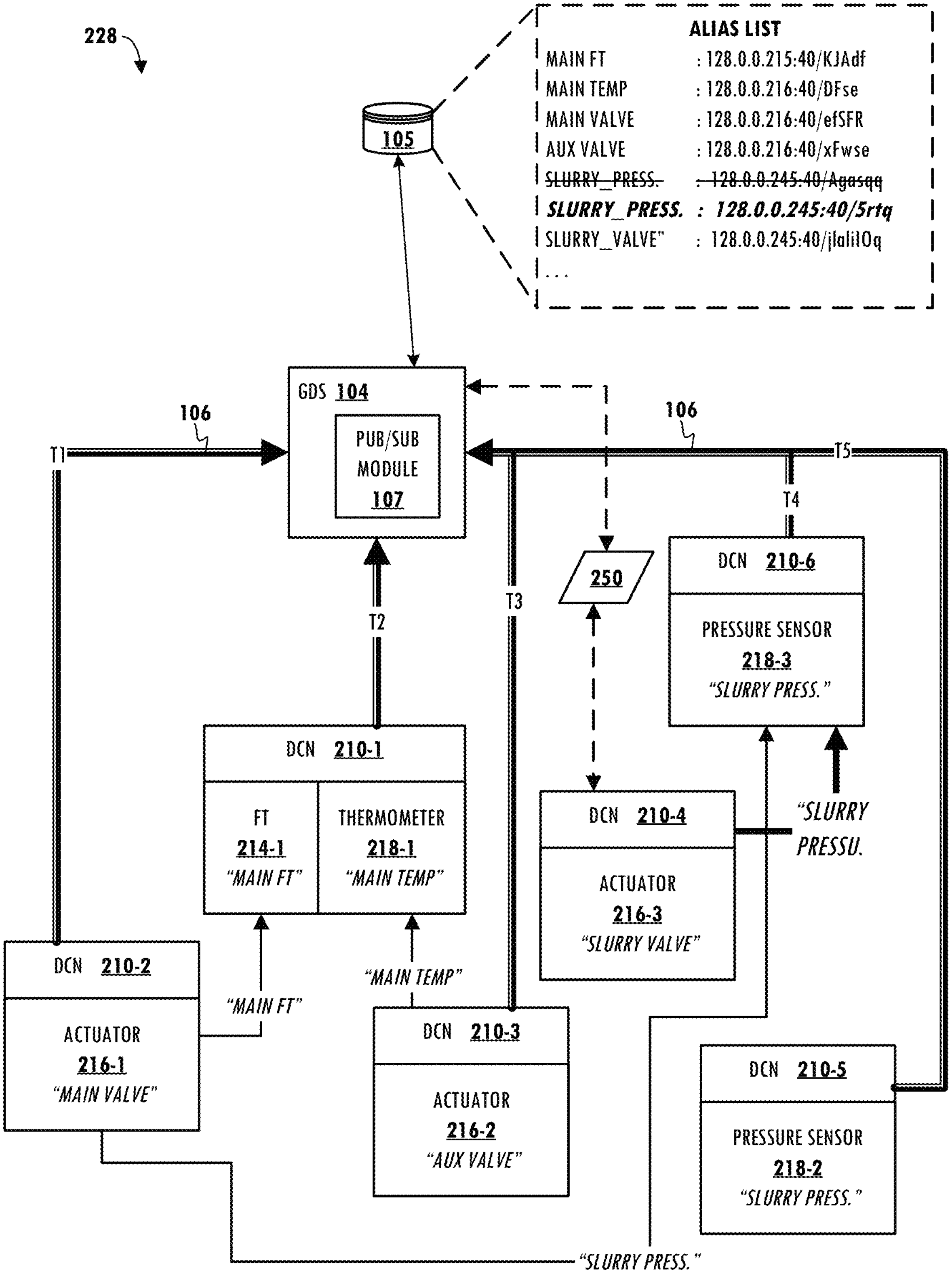
FIG. 6 shows an example of how multiple distributed control nodes react to a targeted alias update message by staggering their connections.

FIG. 6 depicts the environment of FIGS. 2-5 with the DCNs 210-1 to 210-6 staggering their connections to GDS 104 after they receive the alias update datagram broadcasted in FIG. 4. In particular, first DCN 210-1 connects to GDS 104 at time T1. Second DCN connects to GDS 104 at time T2. Third DCN 210-3 connects to GDS 104 at time T3. Fourth DCN 210-4 does not connect to GDS 104 because fourth DCN 210-4 is the DCN that triggered the alias update in the first place. Sixth DCN 210-6 connects to GDS 104 at time T4. Fifth DCN 210-5 connects to GDS 104 at time T5. Assuming times T1-T5 are all different than each other, GDS 104 may have an opportunity to connect with and respond to each DCNs alias polling request before other DCNs attempt the same.

In addition to or instead of staggering connections, GDS 104 may take other mitigation approaches to address possible overburden of GDS 104 when multiple DCNs try to connect to GDS 104 at about the same time. For example, GDS 104 may perform vertical scaling to increase its processing and/or storage capabilities so that it can handle anticipated requests more efficiently. Additionally or alternatively, GDS 104 may perform horizontal scaling by adding one or more additional GDSs, e.g., temporarily during the anticipated surge of alias polling by numerous DCNs at once.

Figure 7:
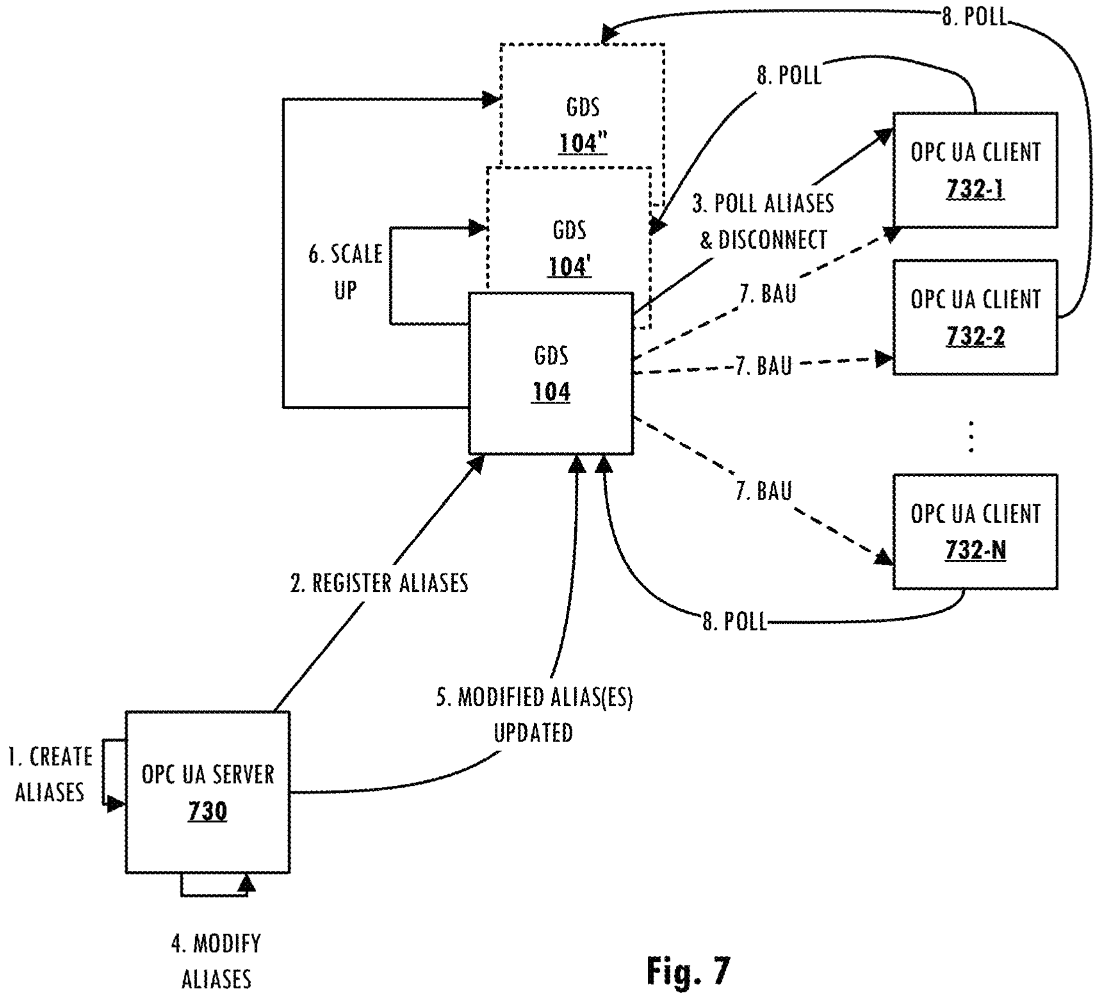
FIG. 7 shows a flowchart illustrating an example of how various components may update aliases in a process automation facility.

FIG. 7 schematically depicts an alternative view of how techniques described herein may be used to horizontally scale a GDS 104 to mitigate against surges of alias polling by numerous DCNs at once. FIG. 7 also depicts a cross-platform server in the form of OPC UA server 730 and cross-platform clients in the form of OPC UA clients 732-1 to 732-N. A sequence of arrows labeled 1-8 indicate an order of operations. At the arrow labeled 1, OPC UA server 730 creates one or more aliases, e.g., for a sensor or actuator onboard a DCN (not depicted in FIG. 7) that hosts OPC UA server. For instance, a system integrator may provide an alias configuration file to OPC UA server 730 that indicates that the connection string associated with the particular sensor or actuator should be registered to a particular human-readable alias.

At the arrow labeled 2, OPC UA server 730 registers the one or more newly-created aliases with GDS 104. This may cause GDS 104 to create mapping(s) in database 105 between the connection string(s) associated with sensor(s)/actuator(s) and human-readable alias(es). At the arrow labeled 3, at least one OPC UA client 731-1 polls GDS 104 with a read operation (e.g., querying database 105 for the alias(es) associated with the one or more sensors/actuators that OPC UA server 730 registered with GDS 104), and then disconnects.

Next, and as indicated at the arrow labeled 4, OPC UA server 730 modifies one or more aliases, e.g., of one or more sensors and/or actuators hosted by the DCN (not depicted) that also hosts OPC UA server 730. As an example, a sensor or actuator may be replaced with a functionally equivalent device, requiring an alias update to reflect the new connection string. At the arrow labeled 5, OPC UA server 730 may register the new one or more modified aliases with GDS 104. This may cause mapping(s) in database 105 to be updated.

At the arrow labeled 6, GDS 104 may preemptively and horizontally scale up, e.g., by instantiating two additional instances of GDS, 104' and 104", in anticipation of additional client/server connections from OPC UA clients 732-1 to 732-N. GDS 104 may use various techniques for such horizontal scaling up, including but not limited to deploying instances of GDS in a Kubernetes platform or cluster to add processing and memory resources to GDS 104.

Meanwhile, at the arrows labeled 7, GDS 104, or pub/sub module 107 as depicted in earlier figures, may broadcast an alias update message (BAU) to OPC UA clients 732-1 to 732-N over process automation network(s) as described herein. As noted previously, these broadcast alias update messages may be untargeted or targeted, and may be packaged in a connectionless and/or stateless datagram, e.g., using protocols such as UDP or MQTT. At the arrows labeled 8, each of OPC UA clients 732-1 to 732-N may connect to and poll one of the multiple instances of GDS 104, 104', 104" for updated alias(es). These polling connections may be implemented using connectionless/stateless protocols such as UDP or MQTT, or they may be implemented using stateful protocols such as TCP over sockets. As depicted, the polling requests from the OPC UA clients 732-1 to 732-N are distributed across the multiple instances of GDS 104, 104', 104", instead of overwhelming the single original instance 104.

While not shown in FIG. 7, at some point after OPC UA clients 732-1 to 732-N poll the various instances of GDS 104, 104', 104" and receive updated aliases, they may disconnect. At this point, GDS 104 may scale down horizontally or vertically. With horizontal downscaling, the extra instances of GDS 104' and 104" may be terminated, e.g., by decommissioning them. This may be done using Kubernetes by deleting deployments or Statefulsets representing GDS 104', and 104" using the kubectl delete command. In some implementations, a scaling policy implemented by GDS 104 could automatically trigger this action when resource utilization falls below a defined threshold.

Figure 8:
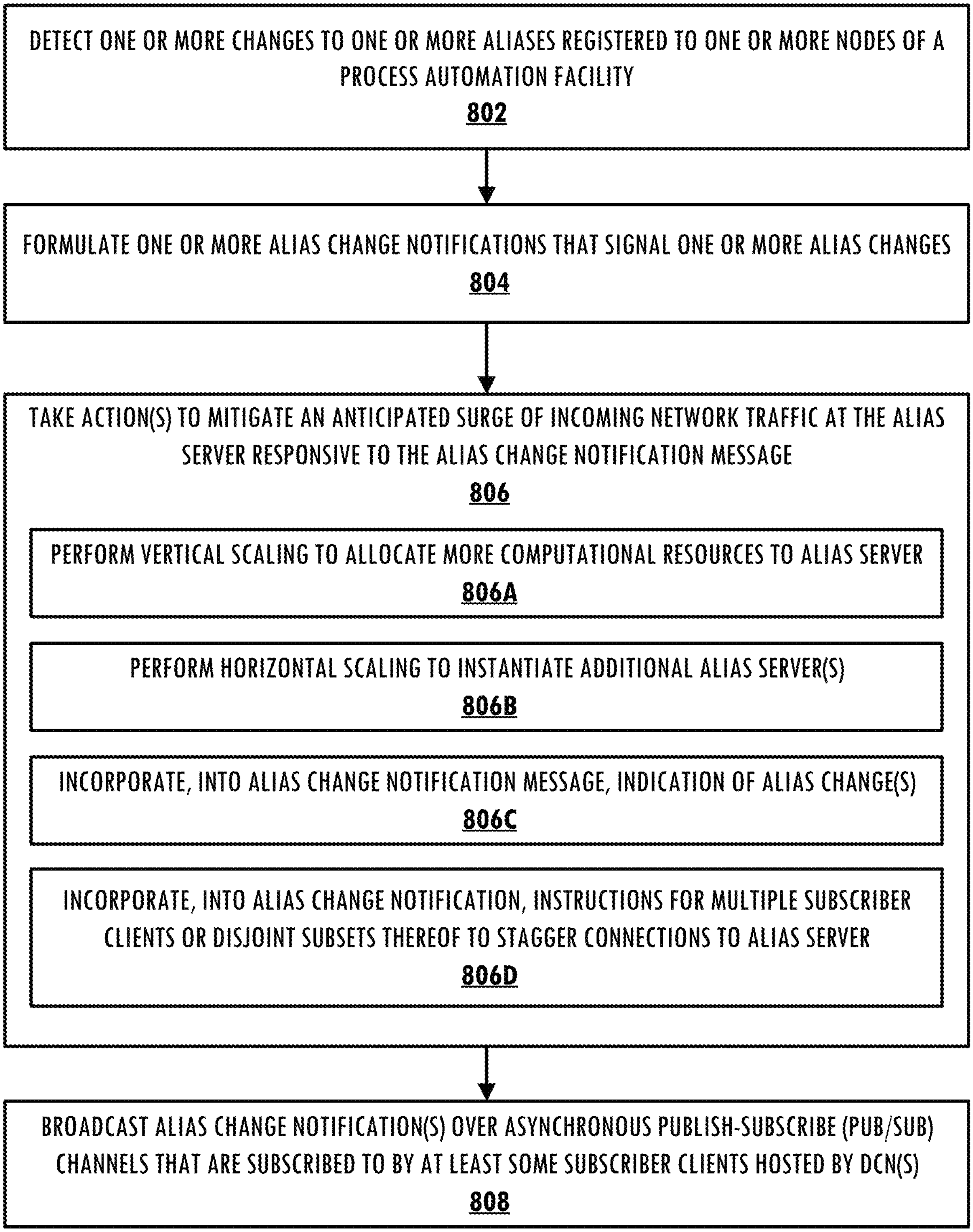
FIG. 8 shows a block diagram of an example method that may be practiced implementing various aspects of the disclosure.

FIG. 8 schematically depicts an example method for performing selected aspects of the present disclosure. For convenience, the operations of the flow chart are described with reference to a system that performs the operations. This system may include various components of various computer systems, including but not limited to GDS 104 and/or alias pub/sub module 107. Moreover, while operations of the flow chart are shown in a particular order, this is not meant to be limiting. One or more operations may be reordered, omitted or added.

At block 802, the system may detect one or more changes to one or more aliases registered to one or more nodes of a process automation facility. For example, a new sensor is added to a DCN (e.g., 110-1 in FIG. 1), requiring a new alias to be registered, or an existing sensor (e.g., 118-3 in FIG. 1) is moved to a different DCN, requiring the alias to be updated with a new connection string. Another example is a software update on a DCN that changes the node ID of a component, necessitating an alias update.

At block 804, the system may formulate one or more alias change notifications that signal one or more alias changes. The notification may simply indicate that changes have occurred (an untargeted message), or it may specify which aliases have changed (a targeted message). For example, a simple message might state "Alias updates available," while a targeted message could list the specific aliases updated, such as "Aliases 'MAIN FT' and 'SLURRY PRESS' have been updated". Another example is a message indicating "Alias 'MAIN TEMP' deleted".

At block 806, the system may take one or more actions to mitigate an anticipated surge of incoming network traffic at the alias server responsive to the alias change notification message. This might involve, at block 806A, vertical scaling (e.g., allocating more memory to the GDS 104 in FIG. 1). For example, the GDS might allocate more CPU cores to the GDS 104 server to handle the increased load. The mitigative actions might also include, at block 806B, horizontal scaling. For instance, the GDS might create additional GDS instances, such as 104' and 104" in FIG. 7 (e.g., by instantiating additional GDS instances using a Kubernetes replica set). Additionally or alternatively, at block 806C, the system may incorporate information into the notification message to reduce the urgency of client responses, such as indicating which aliases changed or that an alias was deleted (i.e. making the message targeted).

Additionally or alternatively, at block 806D, the system may instruct individual and/or disjoint subsets of cross-platform clients (e.g., OPC UA clients) to stagger their connection attempts. Each subscriber client could be assigned a unique identifier, such as an IP address. The GDS could then use a bitmask to specify subsets of clients that should connect at different times. For example, a bitmask could divide clients into groups based on their subnet, allowing the GDS to instruct clients in different subnets to connect at staggered intervals. Alternatively, the bitmask could directly address individual clients, specifying a connection schedule for each. The notification message would include the bitmask and a timestamp, allowing clients to determine their connection time based on their identifier.

At block 808, the system may broadcast the one or more alias change notifications over one or more asynchronous PUB/SUB channels that are subscribed to by at least some cross-platform clients hosted by one or more of the DCNs. For example, the alias change notification may be broadcast using MQTT over a dedicated channel for alias changes (e.g., as shown in FIG. 4), separate from channels for server registration or model changes. Another example involves using UDP to broadcast the notifications across the process automation network 106. The clients (e.g., 122-A and 122-B in FIG. 1) would be subscribed to these channels to receive the updates.

Figure 9:
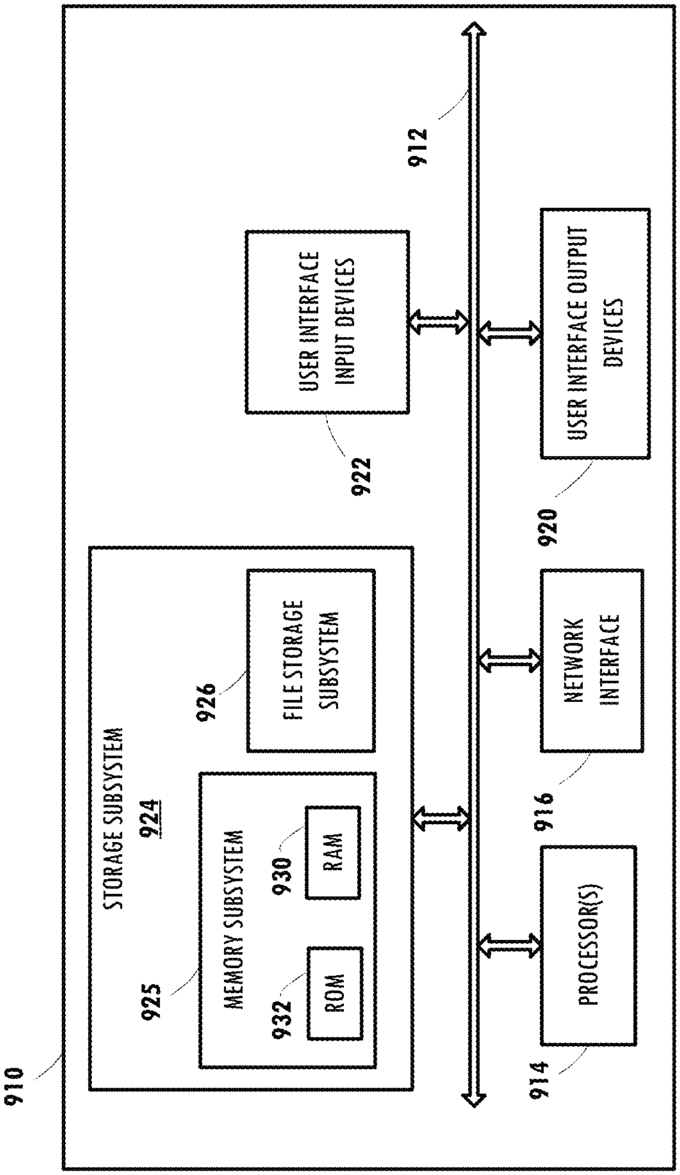
FIG. 9 shows a block diagram of an example computing device that may be used to implement various aspects of the disclosure.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, augmented and/or virtual reality headsets, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method described in connection with FIG. 8.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In various implementations, a method may be implemented using one or more processors and may include implementing an alias server that detects one or more changes to one or more aliases registered to one or more nodes of a process automation facility, each node including a sensor or actuator, and the process automation facility including a plurality of distributed control nodes (DCNs) operably coupled via a process automation network. The alias server formulates one or more alias change notifications signaling one or more alias changes. The alias server takes one or more mitigative actions to mitigate an anticipated surge of incoming network traffic at the alias server responsive to the alias change notification message. The alias server broadcasts the one or more alias change notifications over one or more asynchronous publish-subscribe (PUB/SUB) channels that are subscribed to by at least some subscriber clients hosted by one or more of the DCNs.

The method can include performing vertical scaling to allocate more computational resources to the alias server. In some implementations, the method can include performing horizontal scaling to instantiate one or more additional alias servers. In some versions of those implementations, the alias change notification message can include an indication of one or more of the changes to one or more of the aliases.

In some implementations, the one or more alias change notifications can include an alias change notification and a server registration notification. In some versions of those implementations, the one or more PUB/SUB channels can include a first PUB/SUB channel for publishing alias changes and a second PUB/SUB channel for publishing server registration notifications.

In some implementations, the mitigative actions can include incorporating, into the alias change notification, instructions for multiple disjoint subsets of the subscriber clients to stagger connections to the alias server. In some versions of those implementations, the mitigative actions can include incorporating, into the alias change notification, instructions for multiple individual subscriber clients to stagger connections to the alias server.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
- detecting, by an alias server, one or more changes to one or more aliases registered to one or more nodes of a process automation facility, wherein each node comprises a sensor or actuator and the process automation facility comprises a plurality of distributed control nodes (DCNs) operably coupled via a process automation network;
- formulating one or more alias change notifications that signal one or more alias changes;
- taking one or more mitigative actions to mitigate an anticipated surge of incoming network traffic at the alias server responsive to the alias change notification message; and
- broadcasting the one or more alias change notifications over one or more asynchronous publish-subscribe (PUB/SUB) channels that are subscribed to by at least some subscriber clients hosted by one or more of the DCNs.

2. The method of claim 1, wherein one or more of the mitigative actions comprises performing vertical scaling to allocate more computational resources to the alias server.

3. The method of claim 1, wherein one or more of the mitigative actions comprises performing horizontal scaling to instantiate one or more additional alias servers.

4. The method of claim 1, wherein one or more of the mitigative actions comprises incorporating, into the alias change notification message, an indication of one or more of the changes to one or more of the aliases.

5. The method of claim 1, wherein the one or more alias changes notifications comprise an alias change notification and a server registration notification.

6. The method of claim 5, wherein the one or more PUB/SUB channels comprise a first PUB/SUB channel for publishing alias changes and a second PUB/SUB channel for publishing server registration notifications.

7. The method of claim 1, wherein one or more of the mitigative actions comprises incorporating, into the alias change notification, instructions for multiple disjoint subsets of the subscriber clients to stagger connections to the alias server.

8. The method of claim 1, wherein one or more of the mitigative actions comprises incorporating, into the alias change notification, instructions for multiple individual subscriber clients to stagger connections to the alias server.

9. A system comprising one or more processors and memory storing instructions that, in response to execution of the instructions by the one or more processors, cause the one or more processors to:

detect one or more changes to one or more aliases registered to one or more nodes of a process automation facility, wherein each node comprises a sensor or actuator and the process automation facility comprises a plurality of distributed control nodes (DCNs) operably coupled via a process automation network;

formulate one or more alias change notifications that signal one or more alias changes;

take one or more mitigative actions to mitigate an anticipated surge of incoming network traffic at the alias server responsive to the alias change notification message; and broadcast the one or more alias change notifications over one or more asynchronous publish-subscribe (PUB/SUB) channels that are subscribed teo by at least some subscriber clients hosted by one or more of the DCNs.

10. The system of claim 9, wherein one or more of the mitigative actions comprises performing vertical scaling to allocate more computational resources to the alias server.

11. The system of claim 9, wherein one or more of the mitigative actions comprises performing horizontal scaling to instantiate one or more additional alias servers.

12. The system of claim 9, wherein one or more of the mitigative actions comprises incorporating, into the alias change notification message, an indication of one or more of the changes to one or more of the aliases.

13. The system of claim 9, wherein the one or more alias changes notifications comprise an alias change notification and a server registration notification.

14. The system of claim 13, wherein the one or more PUB/SUB channels comprise a first PUB/SUB channel for publishing alias changes and a second PUB/SUB channel for publishing server registration notifications.

15. The system of claim 9, wherein one or more of the mitigative actions comprises incorporating, into the alias change notification, instructions for multiple disjoint subsets of the subscriber clients to stagger connections to the alias server.

16. The system of claim 9, wherein one or more of the mitigative actions comprises incorporating, into the alias change notification, instructions for multiple individual subscriber clients to stagger connections to the alias server.

17. At least one non-transitory computer-readable medium comprising instructions that, in response to execution of the instructions by one or more processors, cause the one or more processors to:

detect one or more changes to one or more aliases registered to one or more nodes of a process automation facility, wherein each node comprises a sensor or actuator and the process automation facility comprises a plurality of distributed control nodes (DCNs) operably coupled via a process automation network;

formulate one or more alias change notifications that signal one or more alias changes;

take one or more mitigative actions to mitigate an anticipated surge of incoming network traffic at the alias server responsive to the alias change notification message; and broadcast the one or more alias change notifications over one or more asynchronous publish-subscribe (PUB/SUB) channels that are subscribed to by at least some subscriber clients hosted by one or more of the DCNs.

18. The at least one non-transitory computer-readable medium of claim 17, wherein one or more of the mitigative actions comprises performing vertical scaling to allocate more computational resources to the alias server.

19. The at least one non-transitory computer-readable medium of claim 17, wherein one or more of the mitigative actions comprises performing horizontal scaling to instantiate one or more additional alias servers.

20. The at least one non-transitory computer-readable medium of claim 17, wherein one or more of the mitigative actions comprises incorporating, into the alias change notification message, an indication of one or more of the changes to one or more of the aliases.

* * * * *